US012593254B2

(12) United States Patent
Sheik et al.

(10) Patent No.: US 12,593,254 B2
(45) Date of Patent: Mar. 31, 2026

(54) METHOD TO ENHANCE FREQUENCY SCAN USING NETWORK OVER THE AIR PARAMETERS

(71) Applicant: QUALCOMM Incorporated, San Diego, CA (US)

(72) Inventors: Ansah Ahmed Sheik, Hyderabad (IN); Sayak Saha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 607 days.

(21) Appl. No.: 17/934,894

(22) Filed: Sep. 23, 2022

(65) Prior Publication Data

US 2024/0107401 A1     Mar. 28, 2024

(51) Int. Cl.
*H04W 64/00*        (2009.01)
*H04W 36/00*        (2009.01)
(52) U.S. Cl.
CPC ...  *H04W 36/0085* (2018.08); *H04W 36/0072* (2013.01)

(58) Field of Classification Search
USPC .............................. 455/436–455, 551–553.1
See application file for complete search history.

(56) References Cited

U.S. PATENT DOCUMENTS

2018/0070303 A1*  3/2018  Tambaram Kailasam ...................
                                                    H04L 69/28
2022/0007254 A1*  1/2022  Da Silva ......... H04W 36/00838
2024/0015629 A1*  1/2024  Jia ......................... H04W 36/08

* cited by examiner

*Primary Examiner* — Suhail Khan

(74) *Attorney, Agent, or Firm* — Patterson + Sheridan, L.L.P.

(57)            ABSTRACT

Certain aspects of the present disclosure provide a method for wireless communications by a user equipment (UE), generally including receiving, from a network entity, information regarding candidate cells configured for conditional handover (CHO), determining, based on the information regarding the candidate cells, an order to scan frequencies for an acquisition database based scan, and performing the acquisition database based scan in the determined order.

26 Claims, 9 Drawing Sheets

500

| | Network Entity (Current Serving Cell) | Network Entity (Candidate Cell(s)) |
| UE | | |

510

Take Candidate Cell Measurements

Measurement Reports

RRCReconfiguration
(CHO Configuration)

515

Detect CHO
Conditions are met

520

Perform RACH Procedure

RRCReconfigurationComplete

800

A method for wireless communications by a UE

Receive, from a network entity, information regarding candidate cells configured for CHO

805

Determine, based on the information regarding the candidate cells, an order to scan frequencies for an acquisition database based scan

810

Perform the acquisition database based scan in the determined order

815

METHOD TO ENHANCE FREQUENCY SCAN USING NETWORK OVER THE AIR PARAMETERS

BACKGROUND

Field of the Disclosure

Aspects of the present disclosure relate to wireless communications, and more particularly, to techniques for enhancing cell frequency scan procedures.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method of wireless communications by a user equipment (UE). The method includes receiving, from a network entity, information regarding candidate cells configured for conditional handover (CHO); determining, based on the information regarding the candidate cells, an order to scan frequencies for an acquisition database based scan; and performing the acquisition database based scan in the determined order.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
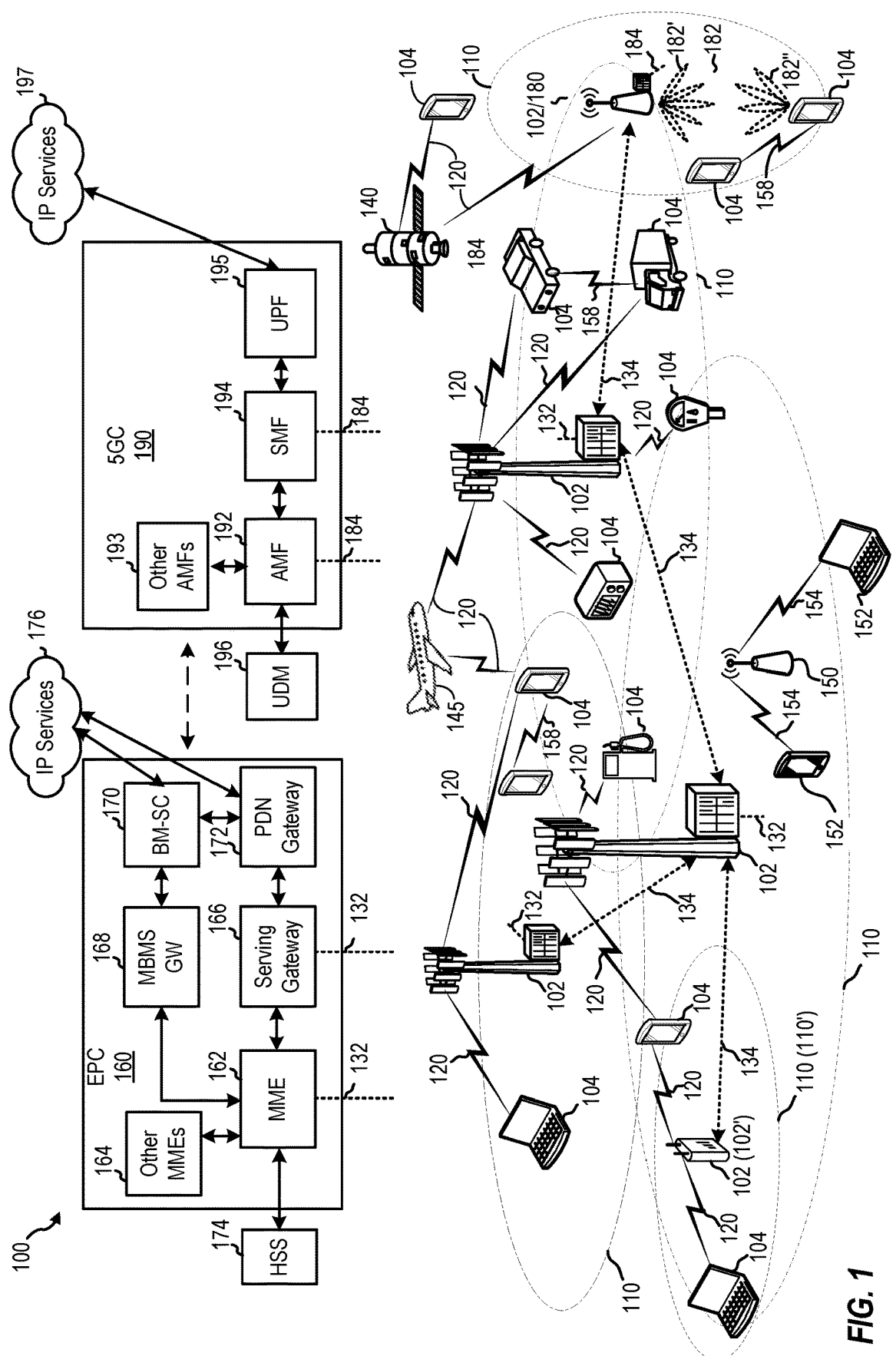
FIG. 1 depicts an example wireless communications network.

Aspects of the present disclosure provide apparatuses, methods, processing systems, and computer-readable mediums for enhancing cell frequency scan procedures.

The techniques presented herein may take advantage of devices that support conditional handover (CHO) procedures. CHO procedures are designed to increase the robustness of handovers and to reduce the number of out of service (OOS) and radio link failure (RLF) occurrences. CHO generally involves multiple stages. In a first stage, the UE sends a measurement report, to a source cell, with potential target cells. Upon receiving this report from the UE, the source cell prepares those target cells and communicates this same back to the UE.

CHO, thus, helps reduce latency and increase reliability by early preparation of the target cells and relies on early measurement reports. The measurement report indicates whether a condition is met, in which case a handover to one of the target gNBs is initiated. A condition is typically considered met, and the conditional handover command is executed, when the serving cell goes bad and/or a target cell becomes sufficiently good (e.g., based on configured thresholds).

In systems that support CHO, the network may signal, over the air (OTA), the configuration of multiple candidate cells and associated execution conditions. Among other parameters, the network may provide the frequency and/or band of the target candidate cells. This information may be stored, at the UE, in an acquisition database and used in cell frequency scans (e.g., triggered by an OOS/RLF).

One potential limitation with this approach is that recent acquisition database entries might not be present at a particular point in time, especially if the user is in a high mobility scenario. While system information blocks (SIBs) could provide some information about neighboring cells, SIBs are generally configured by an operator and do not necessarily reflect the latest snapshot of the deployment of an operator in a particular area. For these reasons, SIBs may not provide an accurate picture of neighboring cells. Further, in some cases, frequencies configured in SIBs may have failed for various reasons or may not be present.

Aspects of the present disclosure, however, may help optimize the order of acquisition database based scans by considering more recent information. For example, a UE may determine an order to scan frequencies in the acquisition database based on information regarding candidate cells configured for CHO. Because CHO candidate cells are based on UE measurements, this information may provide a more accurate picture of neighboring cells (than SIBs).

Thus, CHO frequencies may be added as part of acquisition database base scans and the acquisition database may be updated with subsequent CHO reconfigurations. In this manner, while CHO frequencies are typically cleared after conditions are met, aspects of the present disclosure propose making this frequency/cell information persistent, so that it may be used in subsequent scans.

By optimizing cell frequency scans, aspects of the present disclosure may result in more successful scans, allowing a UE to find suitable cells faster during OOS/RLF recovery. The techniques may lead to a better chance of such scans being successful, without having to go to a full band scan phase, where $100s$ of frequencies might be scanned. Thus, the techniques proposed herein may help save significant amount of power at the UE.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
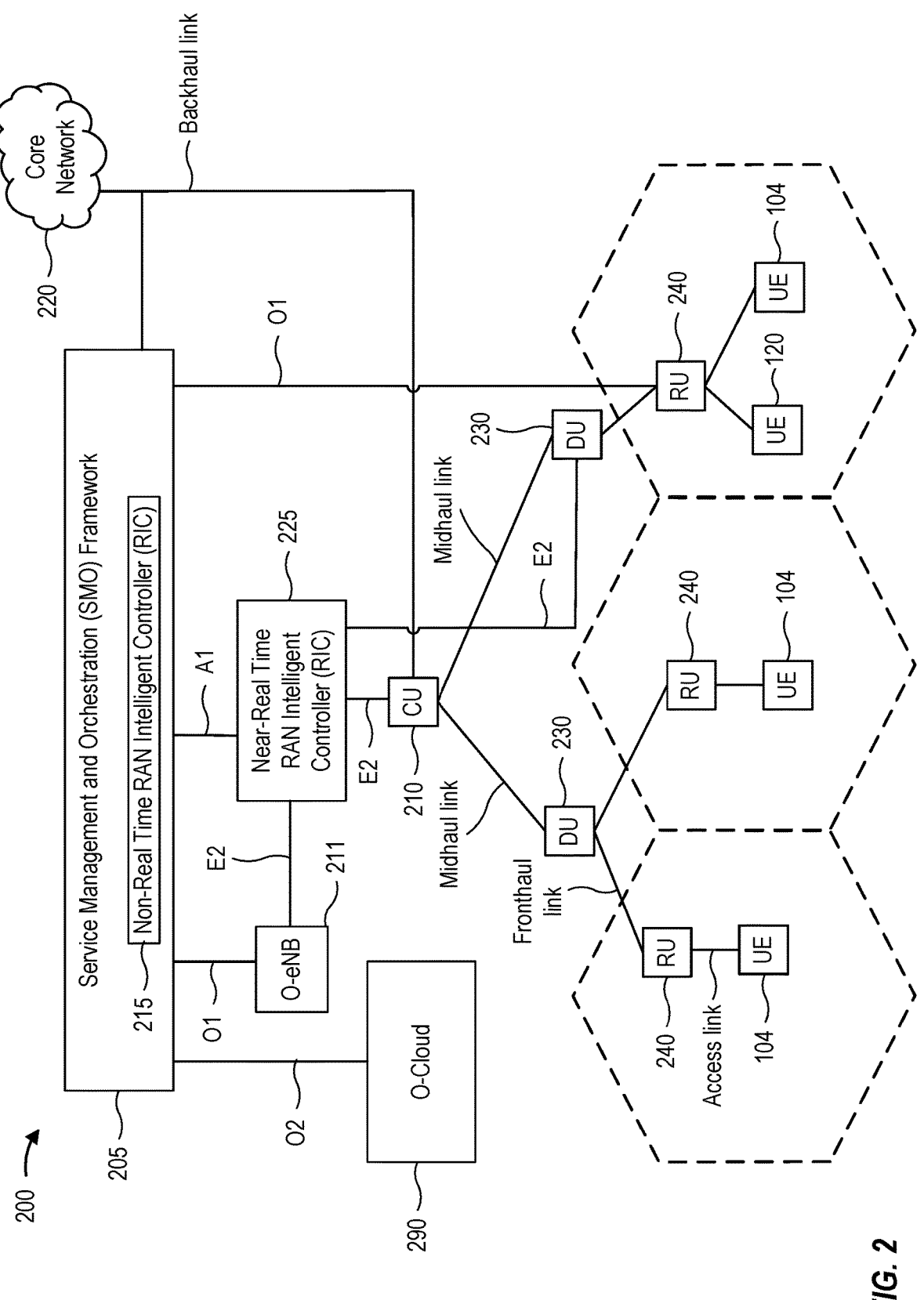
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an Si interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (LAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
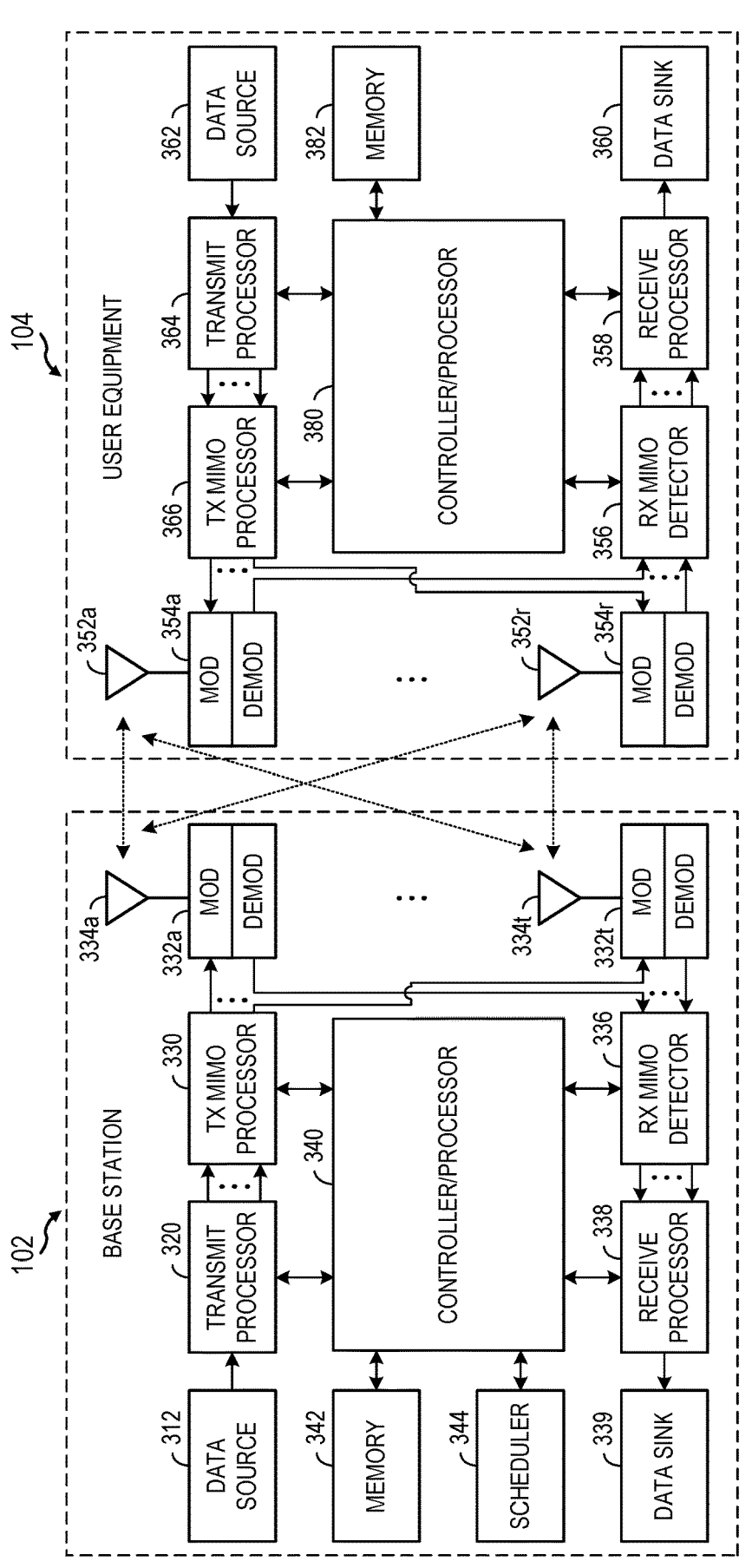
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
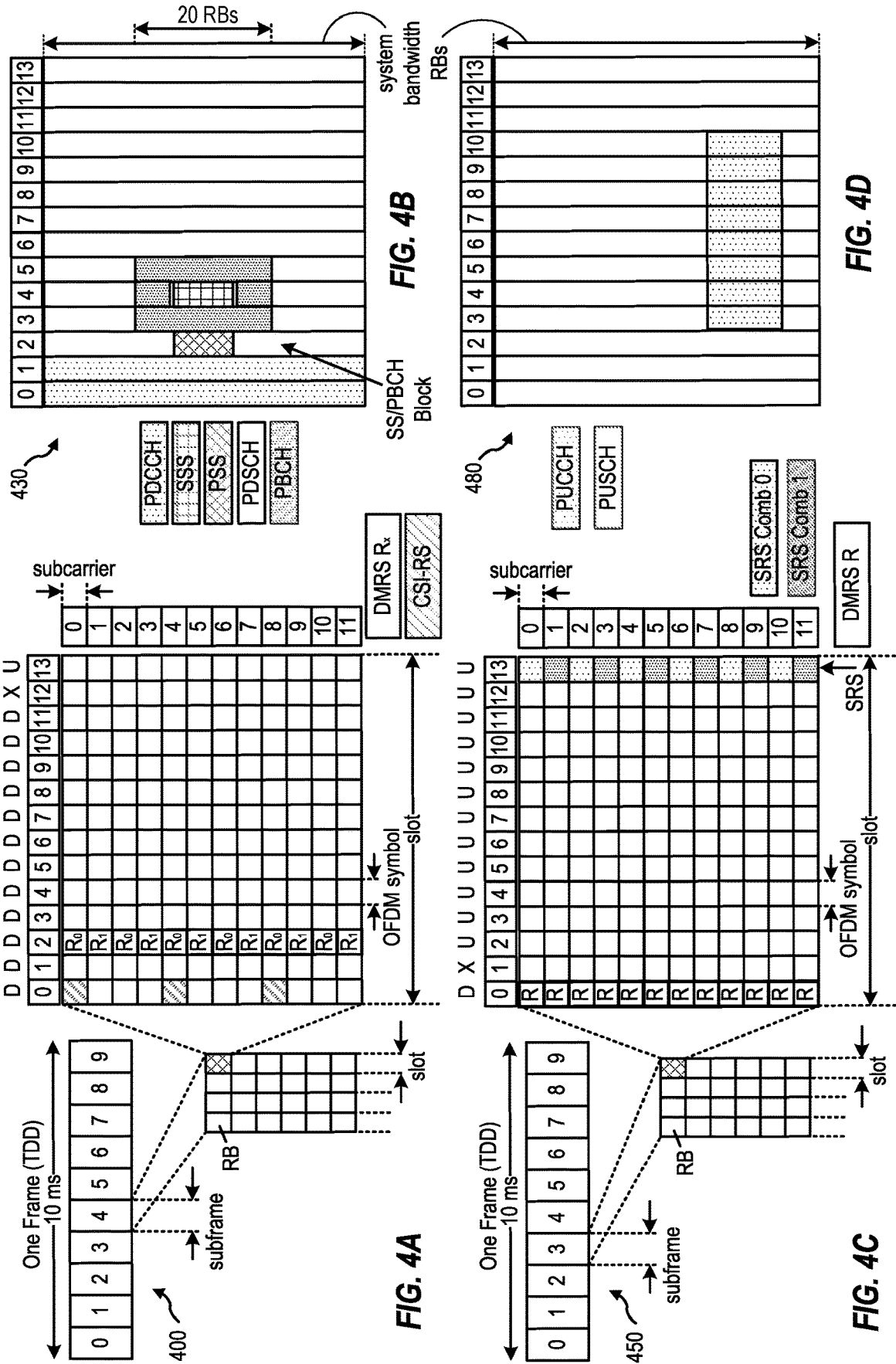
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Overview of MSIM Operation

In some cases, a UE may be configured with multiple subscriber identity modules (SIMs). In a multi-SIM (MSIM) deployment, different SIMS (e.g., SIM1 and SIM2), may support the same or different radio access technologies (RATs). At any given time, the multiple SIMs may concurrently be in an idle state and may support different modes of operation. For example, a UE with a single receiver may support a Single Receive Dual SIM Dual Standby (SR-DSDS) mode, where only one RAT is received at a time. In a Dual Receive (DR)-DSDS mode, the MSIM UE may simultaneously multiple RATs at a time.

NR concurrent radio-access technology (RAT) operation generally refers to operating multiple simultaneous active connections with at least one connection being on NR. For example, the two connections may involve LTE and NR connections, or both NR connections. Multi-SIM devices are able to connect to multiple networks independently without network awareness. Different UE behaviors may occur based on different implementations like dual-SIM dual active (DSDA) or dual-SIM dual standby (DSDS). DSDS generally refers to a dual-SIM deployment where the two SIM cards of the UE may be unable to simultaneously generate traffic. DSDA on the other hand refers to a dual- SIM deployment where both SIM cards of the UE may be active at the same time. As used herein, a SIM generally refers to both virtual and hardware implementations of a SIM. In other words, each SIM may be implemented using hardware (e.g., a physical SIM card) on the multi-SIM device, or implemented virtually using a remote database.

Dual SIM receivers allow the different SIMs to support a variety of different combination options. For example, dual-SIM (DSIM) devices could support the following:

SA-NR+SA-NR: both SIMs could support standalone (SA) NR (SA-NR);

NSA-NR+LTE: one SIM supports non-standalone (NSA) while another SIM supports LTE;

LTE+LTE: both SIMs support LTE;

LTE+W: one SIM supports LTE, the other supports wideband CDMA; or any other combination (X RAT+X RAT both SIMs the same RAT or X RAT+Y RAT the SIMs support different RATs).

In some cases, in a multi-SIM deployment, each SIM of the UE can belong to the same network carrier. For example, two or more SIMs (also referred to herein as subscribers or SUBs) belonging to the same operator can be in the following modes: (1) Idle+Idle: 2 or more SUBs in Idle camp to the same cell/and (2) Connected+Idle: 1 SUB in Idle and 1 Sub Connected camp to the same cell.

Overview of Conditional Handover

CHO procedures are designed to increase the robustness of handovers and to reduce the number of out of service (OOS) and radio link failure (RLF) occurrences. CHO generally involves multiple stages. In a first stage, the UE sends a measurement report, to a source cell, with potential target cells. Upon receiving this report from the UE, the source cell prepares those target cells and communicates this same back to the UE.

Figure 5:
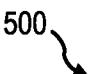
FIG. 5 depicts an example call flow diagram for an enhanced cell frequency search, in accordance with aspects of the present disclosure.

The general concept of CHO may be understood with reference to the call flow diagram 500 of FIG. 5, which shows example signaling between a UE and network entities of a current serving and candidate cells. The UE may be an example of one of the UEs 104 illustrated in FIG. 1 or FIG. 3. The network entities may be examples of a base station 102 illustrated in FIG. 1 or FIG. 3 or a node of a disaggregated base station, as illustrated in FIG. 2.

As illustrated, the UE may take candidate cell measurements, at 510, and forward measurement report(s) to the serving cell. The UE may then receive information regarding candidate cells configured for conditional handover (CHO). For example, based on the measurement report(s), the service cell may transmit an RRC reconfiguration message with a CHO configuration.

The CHO configuration may indicate multiple candidate cells and associated execution conditions. If the UE detects one or more CHO conditions are met, at 515, the UE may perform a RACH procedure with one of the candidate cells, at 520.

Among other parameters, the network may provide the frequency and/or band of the target candidate cells. This information may be stored, at the UE, in an acquisition database and used it in cell frequency scans (e.g., triggered by an OOS/RLF).

CHO, thus, helps reduce latency and increase reliability by early preparation of the target cells and relies on early measurement reports. The measurement report indicates whether a condition is met, in which case a handover to one of the target gNBs is initiated. A condition is typically considered met, and the conditional handover command is executed, when the serving cell goes bad and/or a target cell becomes sufficiently good (e.g., based on configured thresholds).

Aspects Related to Enhanced Frequency Scan Using Over the Air Parameters

Aspects of the present disclosure provide apparatuses, methods, processing systems, and computer-readable mediums for enhancing cell frequency scan procedures. The techniques presented herein may help optimize the order of acquisition database based frequency scans by considering information regarding candidate cells configured for CHO.

Because CHO candidate cells are based on UE measurements, this information may provide a more accurate picture of neighboring cells than other sources of neighbor cell information, such as system information blocks (SIBs).

For example, while SIBs could provide some information about neighboring cells, SIBs are generally configured by an operator and do not necessarily reflect the latest snapshot of the deployment of an operator in a particular area. For these reasons, SIBs may not provide an accurate picture of neighboring cells. Further, in some cases, frequencies configured in SIBs may have failed for various reasons or may not be present.

Aspects of the present disclosure, however, may help optimize the order of acquisition database based scans by considering information regarding candidate cells configured for CHO. Thus, CHO frequencies may be added as part of acquisition database base scans and the acquisition database may be updated with subsequent CHO reconfigurations. In this manner, while CHO frequencies are typically cleared after conditions are met, aspects of the present disclosure propose making this frequency/cell information persistent, so that it may be used in subsequent scans.

Figure 6:
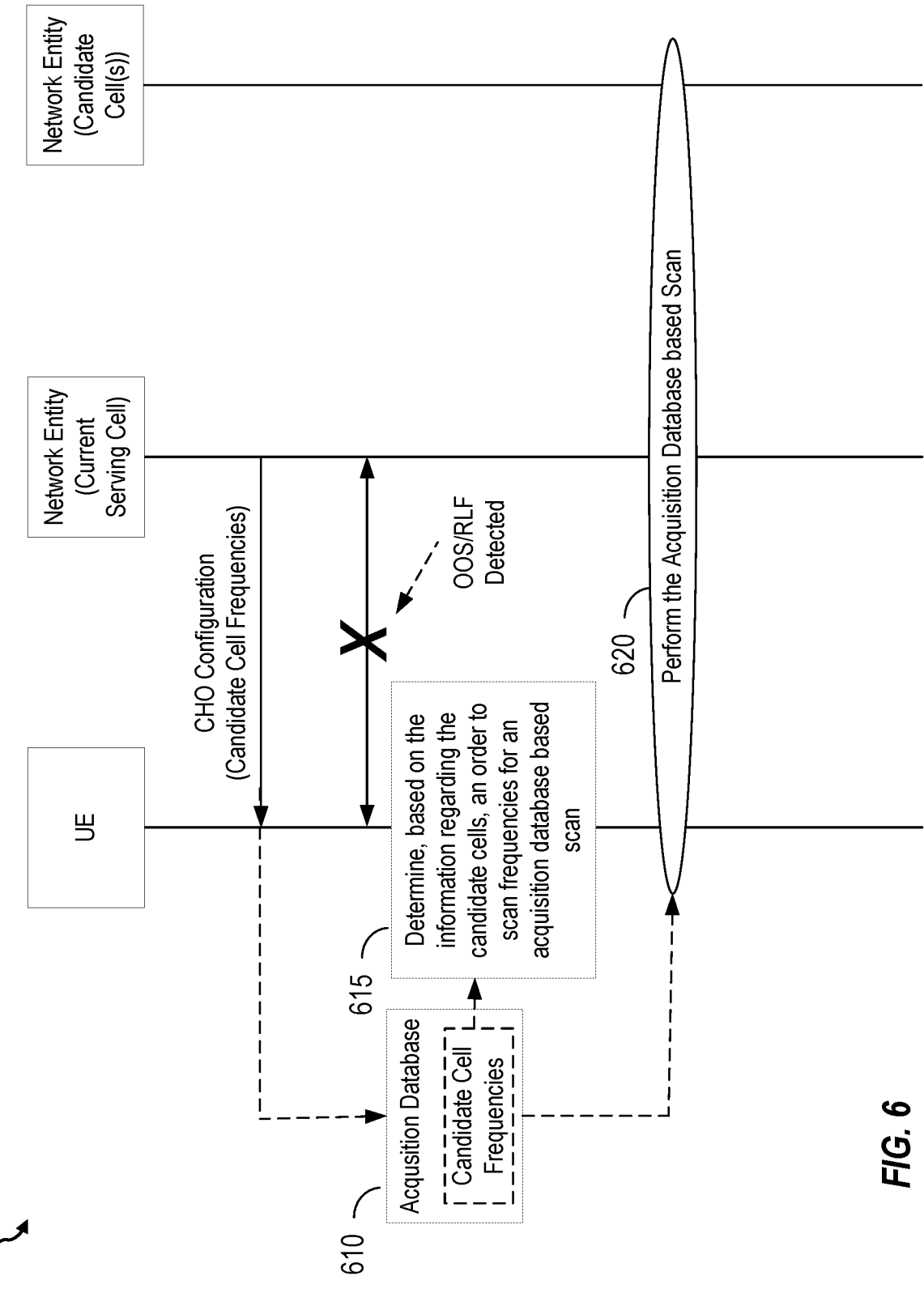
FIG. 6 depicts an example call flow diagram for an enhanced cell frequency search after an out of service (OOS) or radio link failure (RLF), in accordance with aspects of the present disclosure.

The enhanced cell frequency scans proposed herein may be understood with reference to the call flow diagram 600 of FIG. 6, which shows example signaling between a UE and network entities of a current serving and candidate cells. The UE may be an example of one of the UEs 104 illustrated in FIG. 1 or FIG. 3. The network entities may be examples of a base station 102 illustrated in FIG. 1 or FIG. 3 or a node of a disaggregated base station, as illustrated in FIG. 2.

As illustrated, the UE may receive, from a network entity (e.g., a gNB) of the current serving cell, information regarding candidate cells configured for conditional handover (CHO). As illustrated, the UE may update an acquisition database 610 based on the candidate cell frequencies.

The UE may detect an OOS or RLF condition, prompting the UE to perform a cell frequency scan, for example, as part of a public land mobile network (PLMN) search procedure.

As illustrated at 615, the UE may determine an order to scan frequencies for an acquisition database based scan, based on the information regarding the candidate cells. The UE may then perform the acquisition. At 620, the UE may then perform the acquisition database based scan in the determined order.

Aspects of the present disclosure may take advantage of the likelihood that the target cells given by the network in the conditional handover message are good candidates that the network knows are present around the UE. Thus, these target cells are good candidates for the acquisition database.

In some cases, if entries for those cells are already present in the database, the UE may refresh those entries to be indicated as the most recent. In this manner, the UE may be able to always have a latest snapshot of cells in a particular area.

In some cases, the RLF/OOS may happen even after the CHO condition is met. In conventional systems, the CHO configuration (cell frequencies) may be cleared. The techniques proposed herein, however, may help make this cell information persistent, so that it can be used in scans at later times.

According to certain aspects, the UE may refresh the acquisition database on CHO frequency measurements. This information may be used for RLF recovery, just after CHO configuration, or beyond. These CHO frequencies will generally become part of the acquisition database scan and may be updated with subsequent CHO reconfigurations.

In some cases, the order of frequencies scanned may be as follows. Assuming the UE is in connected mode on a first frequency (frequency A), the network may configures Frequencies B, C, and D via a CHO configuration. Upon detecting an RLF, during RLF recover, the UE may perform an acquisition database scan in the following order:

A→B→C→D→band scan.

In other words, the UE may first check the CHO frequencies, which are likely to be surrounding the UE, before proceeding to a full band scan. In this manner, the CHO configured frequencies become good candidates to optimize the acquisition databased based cell frequency scan.

Figure 7:
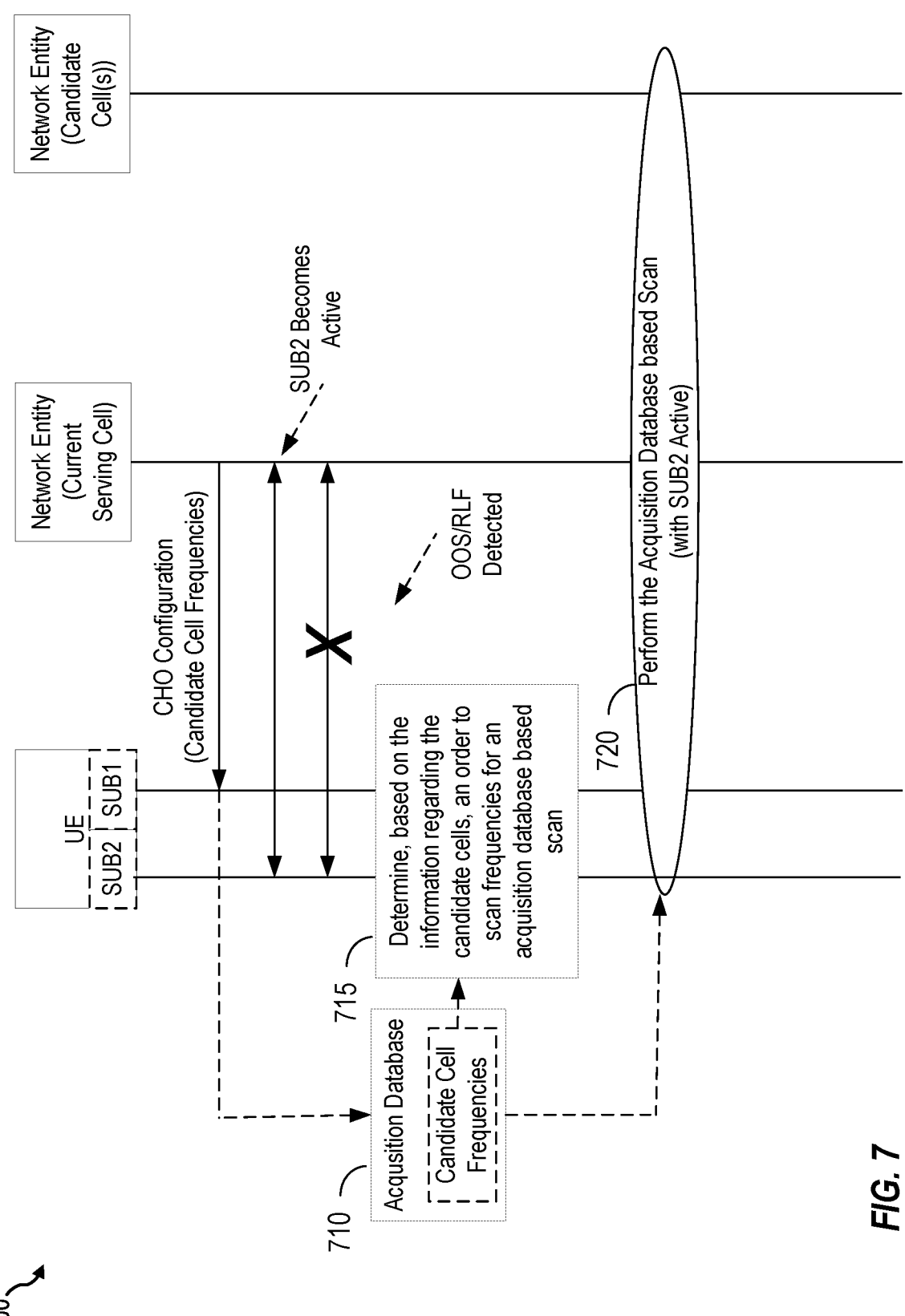
FIG. 7 depicts an example call flow diagram for an enhanced cell frequency search for a multi-SIM (MSIM) scenario, in accordance with aspects of the present disclosure.

Aspects of the present disclosure may also allow for enhanced cell frequency scans for a UE operating in an MSIM mode. Such an MSIM enhancement may be understood with reference to the call flow diagram 700 of FIG. 7.

As illustrated, the UE may be operating in an MSIM mode, with at least a first subscriber (SUB1) and a second SUB (SUB2). As illustrated, the UE may obtain information regarding candidate cells while the first SUB (SUB1) is active and update the acquisition databased 710 accordingly.

SUB 2 may then become active, after which an OOS/RLF may be detected. When performing the acquisition database based scan, after detecting the OOS/RLF, the UE may determine the order of cells to scan based on the data regarding CHO frequencies obtained while the other SUB (SUB1) was active.

This approach may be suitable if both SUBs have the same or an equivalent operator. In this case, So during RLF recovery on one SUB, the UE may scan in the following order:

1. The frequency the UE camped on;
2. Frequencies in CHO OTA configuration from the current SUB;
3. Frequencies in CHO OTA configuration from the other SUB; then
4. The rest of the acquisition database on the current SUB.

In this manner, if the network configured CHO (candidate cells/frequencies) for one SUB and the other SUB goes into RLF, then the other SUB can use these entries to optimize searching to find a new cell.

In some cases, priority ordering of CHO frequencies may be updated dynamically, to scan based on connected measurement. For example, the network may configure a series of cells and the conditions to be met for HO (CHO). These conditions may be configured to lower layers for measurement, so as soon as the criteria set by network is met, the UE may trigger HO. The UE may use this information to order the cells in such a way that the strongest cell is tried (searched) first during the acquisition database scan.

For example, assuming the network has configured frequencies B, C, and D for CHO, as in the previous example, if the UE (physical/PHY layer L1) measures all of B, C, and D, then the UE may arrange these in the order of cell power (e.g., strongest to weakest). During the acquisition database based scan (during RLF/OOS), the UE may try the frequencies in that order.

In some cases, there might be several times the cells being measured can give different power values. Therefore, the order may be dynamically updated (e.g., B→C→D may become C→B→D if at a point cell C becomes stronger). In some cases, if L1 does not find any cell. For example, if L1 measures B and D, but is not able to measure C, then the UE may deprioritize those cells in scan order (e.g., such that the scan order is B→D→C).

By dynamically updating the scanning order in this manner, before the UE detects an RLF, the UE may have the most recent snapshot of the ordering of the cells, configured based on cell power. This may give the UE more confidence in scanning the cells once it detects an RLF.

In some cases, the UE may update priority dynamically based on results of OOS/RLF scans. For example, again assuming the UE is connected on frequency A and the network has configured frequencies B, C, and D for CHO, the UE L1 may measure all cells (B/C/D) and the order may be B→C→D. Once RLF recovery starts the UE may scan in the following order: A→B→C→D→rest of acq db→band scan.

This example assumes the UE was not able to find B/C/D or those were not suitable for some reason. If the UE were to do another round of acquisition database based scanning, however, it may deprioritize those frequencies, such that the new order may be (A→rest of acq db→B→C→D→band scan). As an alternative, the UE may choose to ignore those frequencies in subsequent scans if they are not found.

In some cases, the UE may use both Primary Cell and Secondary Cell (Pcell/Scell) information for Master cell group and Secondary cell group (MCG/SCG) given in a CHO reconfiguration message. The reconfiguration message for CHO in some cases might contain information for both the Pcell and Scell, such that the UE can combine both the information and prioritize in a similar way, as given above. For example, the UE may scan in the following order: Latest acq db→CHO freq from Pcell→CHO freq from Scell→SCG-CHO freq from Pcell→SCG-CHO freq from Scell→rest of acq db→band scan.

By optimizing cell frequency scans, aspects of the present disclosure may result in more successful scans, allowing a UE to find suitable cells faster during OOS/RLF recovery. The techniques may lead to a better chance of such scans being successful, without having to go to a full band scan phase, where 100s of frequencies might be scanned. Thus, the techniques proposed herein may help save significant amount of power at the UE.

Example Operations of a User Equipment

Figure 8:
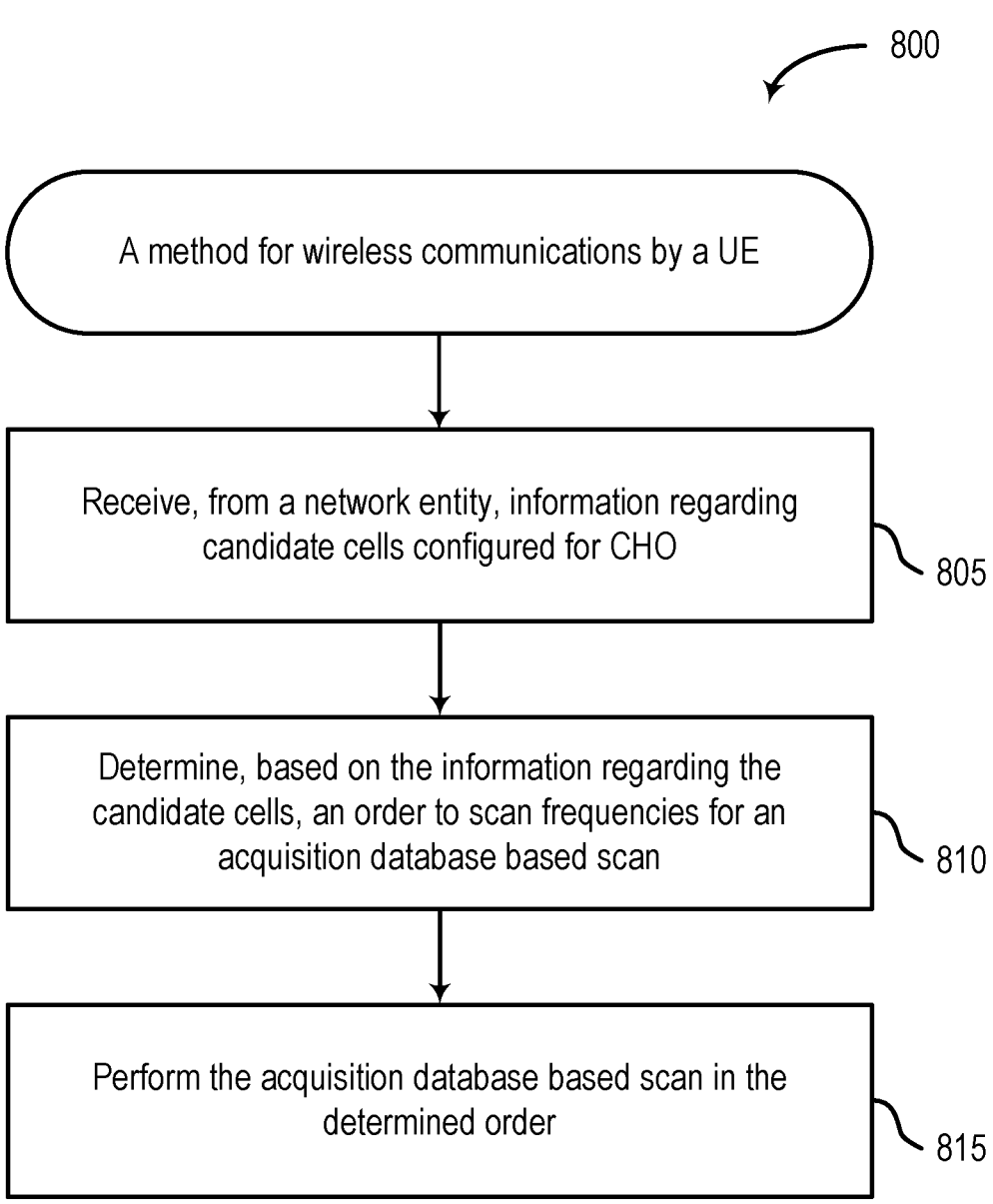
FIG. 8 depicts a method for wireless communications.

FIG. 8 shows an example of a method 800 for wireless communications by a UE, such as UE 104 of FIGS. 1 and 3.

Method 800 begins at step 805 with receiving, from a network entity, information regarding candidate cells configured for CHO. In some cases, the operations of this step refer to, or may be performed by, circuitry for receiving and/or code for receiving as described with reference to FIG. 9.

Method 800 then proceeds to step 810 with determining, based on the information regarding the candidate cells, an order to scan frequencies for an acquisition database based scan. In some cases, the operations of this step refer to, or may be performed by, circuitry for determining and/or code for determining as described with reference to FIG. 9.

Method 800 then proceeds to step 815 with performing the acquisition database based scan in the determined order. In some cases, the operations of this step refer to, or may be performed by, circuitry for performing and/or code for performing as described with reference to FIG. 9.

In some aspects, the acquisition database based scan is performed when at least one of an OOS or RLF is detected.

In some aspects, the method 800 further includes taking measurements on frequencies corresponding to the candidate cells. In some cases, the operations of this step refer to, or may be performed by, circuitry for taking and/or code for taking as described with reference to FIG. 9.

In some aspects, the method 800 further includes updating the acquisition database based on the measurements. In some cases, the operations of this step refer to, or may be performed by, circuitry for updating and/or code for updating as described with reference to FIG. 9.

In some aspects, the order is determined based on the updated acquisition database.

In some aspects, updating the acquisition database based on the measurements comprises: arranging frequencies corresponding to the candidate cells, in the acquisition database, based on strength of their corresponding measurements.

In some aspects, the method 800 further includes re-arranging the frequencies corresponding to the candidate cells, in the acquisition database, based on strength of subsequent measurements. In some cases, the operations of this step refer to, or may be performed by, circuitry for re-arranging and/or code for re-arranging as described with reference to FIG. 9.

In some aspects, the arranging comprises: arranging the frequencies to deprioritize one or more cells for which the corresponding measurement is below a threshold.

In some aspects, the UE is operating in a multi SIM mode with at least a first SUB and a second SUB; at least some of the information regarding candidate cells is obtained while the first SUB was active; and the acquisition database based scan is performed while the second SUB is active.

In some aspects, the information regarding candidate cells configured for CHO comprises: the information regarding candidate cells obtained while the first SUB was active; and additional information regarding candidate cells obtained while the second SUB was active.

In some aspects, the order to scan frequencies for the acquisition database based scan comprises, in order: a last camped frequency; one or more frequencies for candidate cells based on information obtained while the second SUB was active; one or more frequencies for candidate cells based on information obtained while the first SUB was active; and other frequencies in the acquisition databased of the second SUB.

In some aspects, determining the order is also based on results of one or more previous acquisition database based scans.

In some aspects, determining the order based on results of one or more previous acquisition database based scans comprises at least one of: arranging the frequencies to deprioritize one or more cells not found during the one or more previous acquisition database based scans; or ignoring frequencies of one or more cells not found during the one or more previous acquisition database based scans.

In some aspects, the information regarding candidate cells comprises information regarding at least one primary cell and information regarding at least one secondary cell.

Figure 9:
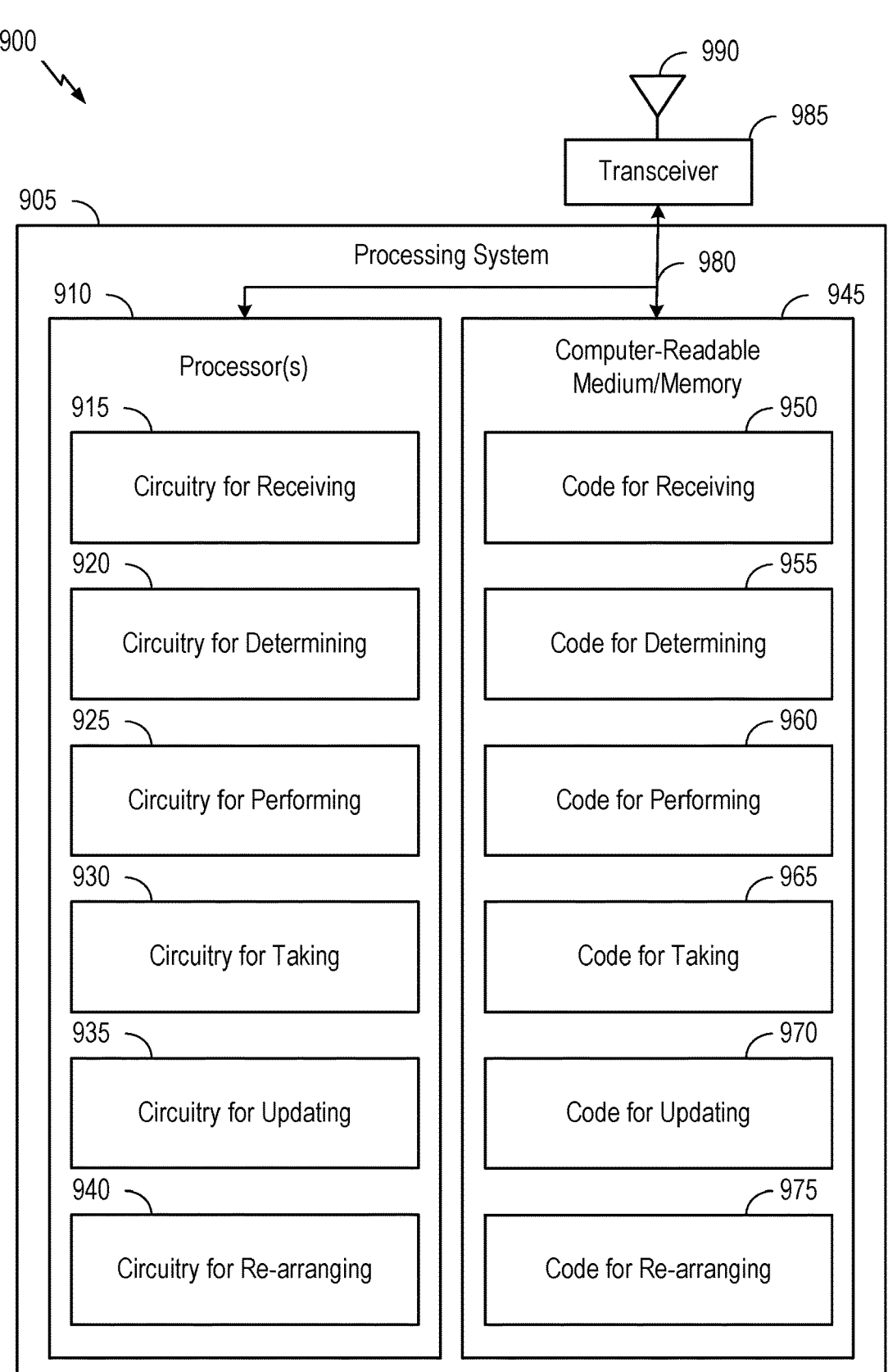
FIG. 9 depicts aspects of an example communications device.

In one aspect, method 800, or any aspect related to it, may be performed by an apparatus, such as communications device 900 of FIG. 9, which includes various components operable, configured, or adapted to perform the method 800. Communications device 900 is described below in further detail.

Note that FIG. 8 is just one example of a method, and other methods including fewer, additional, or alternative steps are possible consistent with this disclosure.

Example Communications Devices

FIG. 9 depicts aspects of an example communications device 900. In some aspects, communications device 900 is a user equipment, such as UE 104 described above with respect to FIGS. 1 and 3.

The communications device 900 includes a processing system 905 coupled to the transceiver 985 (e.g., a transmitter and/or a receiver). The transceiver 985 is configured to transmit and receive signals for the communications device 900 via the antenna 990, such as the various signals as described herein. The processing system 905 may be configured to perform processing functions for the communications device 900, including processing signals received and/or to be transmitted by the communications device 900.

The processing system 905 includes one or more processors 910. In various aspects, the one or more processors 910 may be representative of one or more of receive processor 358, transmit processor 364, TX MIMO processor 366, and/or controller/processor 380, as described with respect to FIG. 3. The one or more processors 910 are coupled to a computer-readable medium/memory 945 via a bus 980. In certain aspects, the computer-readable medium/memory 945 is configured to store instructions (e.g., computer-executable code) that when executed by the one or more processors 910, cause the one or more processors 910 to perform the method 800 described with respect to FIG. 8, or any aspect related to it. Note that reference to a processor performing a function of communications device 900 may include one or more processors 910 performing that function of communications device 900.

In the depicted example, computer-readable medium/memory 945 stores code (e.g., executable instructions), such as code for receiving 950, code for determining 955, code for performing 960, code for taking 965, code for updating 970, and code for re-arranging 975. Processing of the code for receiving 950, code for determining 955, code for performing 960, code for taking 965, code for updating 970, and code for re-arranging 975 may cause the communications device 900 to perform the method 800 described with respect to FIG. 8, or any aspect related to it.

The one or more processors 910 include circuitry configured to implement (e.g., execute) the code stored in the computer-readable medium/memory 945, including circuitry such as circuitry for receiving 915, circuitry for determining 920, circuitry for performing 925, circuitry for taking 930, circuitry for updating 935, and circuitry for re-arranging 940. Processing with circuitry for receiving 915, circuitry for determining 920, circuitry for performing 925, circuitry for taking 930, circuitry for updating 935, and circuitry for re-arranging 940 may cause the communications device 900 to perform the method 800 described with respect to FIG. 8, or any aspect related to it.

Various components of the communications device 900 may provide means for performing the method 800 described with respect to FIG. 8, or any aspect related to it. For example, means for transmitting, sending or outputting for transmission may include transceivers 354 and/or antenna(s) 352 of the UE 104 illustrated in FIG. 3 and/or the transceiver 985 and the antenna 990 of the communications device 900 in FIG. 9. Means for receiving or obtaining may include transceivers 354 and/or antenna(s) 352 of the UE 104 illustrated in FIG. 3 and/or the transceiver 985 and the antenna 990 of the communications device 900 in FIG. 9.

EXAMPLE CLAUSES

Implementation examples are described in the following numbered clauses:

Clause 1: A method for wireless communications by a UE, comprising: receiving, from a network entity, information regarding candidate cells configured for CHO; determining, based on the information regarding the candidate cells, an order to scan frequencies for an acquisition database based scan; and performing the acquisition database based scan in the determined order.

Clause 2: The method of Clause 1, wherein: the acquisition database based scan is performed when at least one of an OOS or RLF is detected.

Clause 3: The method of any one of Clauses 1 and 2, further comprising: taking measurements on frequencies corresponding to the candidate cells; and updating the acquisition database based on the measurements.

Clause 4: The method of Clause 3, wherein the order is determined based on the updated acquisition database.

Clause 5: The method of Clause 3, wherein updating the acquisition database based on the measurements comprises: arranging frequencies corresponding to the candidate cells, in the acquisition database, based on strength of their corresponding measurements.

Clause 6: The method of Clause 5, further comprising: re-arranging the frequencies corresponding to the candidate cells, in the acquisition database, based on strength of subsequent measurements.

Clause 7: The method of Clause 5, wherein the arranging comprises: arranging the frequencies to deprioritize one or more cells for which the corresponding measurement is below a threshold.

Clause 8: The method of any one of Clauses 1-7, wherein: the UE is operating in a multi SIM mode with at least a first SUB and a second SUB; at least some of the information regarding candidate cells is obtained while the first SUB was active; and the acquisition database based scan is performed while the second SUB is active.

Clause 9: The method of Clause 8, wherein the information regarding candidate cells configured for CHO comprises: the information regarding candidate cells obtained while the first SUB was active; and additional information regarding candidate cells obtained while the second SUB was active.

Clause 10: The method of Clause 9, wherein the order to scan frequencies for the acquisition database based scan comprises, in order: a last camped frequency; one or more frequencies for candidate cells based on information obtained while the second SUB was active; one or more frequencies for candidate cells based on information obtained while the first SUB was active; and other frequencies in the acquisition databased of the second SUB.

Clause 11: The method of any one of Clauses 1-10, wherein determining the order is also based on results of one or more previous acquisition database based scans.

Clause 12: The method of Clause 11, wherein determining the order based on results of one or more previous acquisition database based scans comprises at least one of: arranging the frequencies to deprioritize one or more cells not found during the one or more previous acquisition database based scans; or ignoring frequencies of one or more cells not found during the one or more previous acquisition database based scans.

Clause 13: The method of any one of Clauses 1-12, wherein: the information regarding candidate cells comprises information regarding at least one primary cell and information regarding at least one secondary cell.

Clause 14: An apparatus, comprising: a memory comprising executable instructions; and a processor configured to execute the executable instructions and cause the apparatus to perform a method in accordance with any one of Clauses 1-13.

Clause 15: An apparatus, comprising means for performing a method in accordance with any one of Clauses 1-13.

Clause 16: A non-transitory computer-readable medium comprising executable instructions that, when executed by a processor of an apparatus, cause the apparatus to perform a method in accordance with any one of Clauses 1-13.

Clause 17: A computer program product embodied on a computer-readable storage medium comprising code for performing a method in accordance with any one of Clauses 1-13.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications at a user equipment (UE), comprising:
 receiving, from a network entity, information regarding candidate cells configured for conditional handover (CHO);
 determining, based on the information regarding the candidate cells, an order to scan frequencies for a scan based on an acquisition database;
 taking measurements on frequencies corresponding to the candidate cells;
 updating the acquisition database based on the measurements; and
 performing the scan in the determined order based on the updated acquisition database.

2. The method of claim 1, wherein:
 the scan is performed when at least one of an out of service (OOS) or radio link failure (RLF) is detected.

3. The method of claim 1, wherein the order is determined based on the updated acquisition database.

4. The method of claim 1, wherein updating the acquisition database based on the measurements comprises:

arranging frequencies corresponding to the candidate cells, in the acquisition database, based on strength of their corresponding measurements.

5. The method of claim 4, further comprising re-arranging the frequencies corresponding to the candidate cells, in the acquisition database, based on strength of subsequent measurements.

6. The method of claim 4, wherein the arranging comprises:
 arranging the frequencies to deprioritize one or more cells for which the corresponding measurement is below a threshold.

7. The method of claim 1, wherein:
 the UE is operating in a multi subscriber identity module (SIM) mode with at least a first subscriber (SUB) and a second SUB;
 at least some of the information regarding candidate cells is obtained while the first SUB was active; and
 the scan is performed while the second SUB is active.

8. The method of claim 7, wherein the information regarding candidate cells configured for CHO comprises:
 the information regarding candidate cells obtained while the first SUB was active; and
 additional information regarding candidate cells obtained while the second SUB was active.

9. The method of claim 8, wherein the order to scan frequencies for the scan comprises, in order:
 a last camped frequency;
 one or more frequencies for candidate cells based on information obtained while the second SUB was active;
 one or more frequencies for candidate cells based on information obtained while the first SUB was active; and
 other frequencies in an acquisition database of the second SUB.

10. The method of claim 1, wherein determining the order is also based on results of one or more previous acquisition database based scans.

11. The method of claim 10, wherein determining the order based on results of one or more previous acquisition database based scans comprises at least one of:
 arranging the frequencies to deprioritize one or more cells not found during the one or more previous acquisition database based scans; or
 ignoring frequencies of one or more cells not found during the one or more previous acquisition database based scans.

12. The method of claim 1, wherein:
 the information regarding candidate cells comprises information regarding at least one primary cell and information regarding at least one secondary cell.

13. A user equipment (UE) configured for wireless communication, comprising: a memory comprising computer-executable instructions; and one or more processors configured to execute the computer-executable instructions and cause the UE to:
 receive, from a network entity, information regarding candidate cells configured for conditional handover (CHO);
 determine, based on the information regarding the candidate cells, an order to scan frequencies for a scan based on an acquisition database;
 take measurements on frequencies corresponding to the candidate cells;
 update the acquisition database based on the measurements; and perform the scan in the determined order based on the updated acquisition database.

14. The UE of claim 13, wherein:

the scan is performed when at least one of an out of service (OOS) or radio link failure (RLF) is detected.

15. The UE of claim 13, wherein the order is determined based on the updated acquisition database.

16. The UE of claim 13, wherein updating the acquisition database based on the measurements comprises:

arranging frequencies corresponding to the candidate cells, in the acquisition database, based on strength of their corresponding measurements.

17. The UE of claim 16, wherein the one or more processors are configured to execute the computer-executable instructions and further cause the UE to: re-arrange the frequencies corresponding to the candidate cells, in the acquisition database, based on strength of subsequent measurements.

18. The UE of claim 16, wherein the arranging comprises:

arranging the frequencies to deprioritize one or more cells for which the corresponding measurement is below a threshold.

19. The UE of claim 13, wherein:

the UE is operating in a multi subscriber identity module (SIM) mode with at least a first subscriber (SUB) and a second SUB;

at least some of the information regarding candidate cells is obtained while the first SUB was active; and the scan is performed while the second SUB is active.

20. The UE of claim 19, wherein the information regarding candidate cells configured for CHO comprises:

the information regarding candidate cells obtained while the first SUB was active; and additional information regarding candidate cells obtained while the second SUB was active.

21. The UE of claim 20, wherein the order to scan frequencies for the scan comprises, in order:

a last camped frequency;

one or more frequencies for candidate cells based on information obtained while the second SUB was active;

one or more frequencies for candidate cells based on information obtained while the first SUB was active; and other frequencies in an acquisition database of the second SUB.

22. The UE of claim 13, wherein determining the order is also based on results of one or more previous acquisition database based scans.

23. The UE of claim 22, wherein determining the order based on results of one or more previous acquisition database based scans comprises at least one of:

arranging the frequencies to deprioritize one or more cells not found during the one or more previous acquisition database based scans; or ignoring frequencies of one or more cells not found during the one or more previous acquisition database based scans.

24. The UE of claim 13, wherein:

the information regarding candidate cells comprises information regarding at least one primary cell and information regarding at least one secondary cell.

25. An apparatus for wireless communications at a user equipment (UE), comprising:

means for receiving, from a network entity, information regarding candidate cells configured for conditional handover (CHO);

means for determining, based on the information regarding the candidate cells, an order to scan frequencies a scan based on an acquisition database;

means for taking measurements on frequencies corresponding to the candidate cells;

means for updating the acquisition database based on the measurements; and means for performing the scan in the determined order based on the updated acquisition database.

26. A non-transitory computer readable medium having instructions stored thereon for:

receiving, from a network entity, information regarding candidate cells configured for conditional handover (CHO);

determining, based on the information regarding the candidate cells, an order to scan frequencies a scan based on an acquisition database;

taking measurements on frequencies corresponding to the candidate cells;

updating the acquisition database based on the measurements; and performing the scan in the determined order based on the updated acquisition database.

* * * * *